(12) United States Patent
Britton et al.

(10) Patent No.: US 8,335,792 B2
(45) Date of Patent: Dec. 18, 2012

(54) METHODS AND APPARATUS FOR ENTERPRISE APPLICATION INTEGRATION

(76) Inventors: Colin P. Britton, Lexington, MA (US); Amir Azmi, Billerica, MA (US); Ashok Kumar, Marlborough, MA (US); Noah W. Kaufman, Cambridge, MA (US); Chandra Bajpai, Natick, MA (US); Robert F. Angelo, Sudbury, MA (US)

( * ) Notice: Subject to any disclaimer, the term of this patent is extended or adjusted under 35 U.S.C. 154(b) by 369 days.

(21) Appl. No.: 11/430,258

(22) Filed: May 8, 2006

(65) Prior Publication Data
US 2006/0277227 A1   Dec. 7, 2006

Related U.S. Application Data

(63) Continuation of application No. 09/917,264, filed on Jul. 27, 2001, now Pat. No. 7,058,637.

(60) Provisional application No. 60/291,185, filed on May 15, 2001.

(51) Int. Cl.
 *G06F 7/00* (2006.01)
 *G06F 17/30* (2006.01)
(52) U.S. Cl. ....................................................... 707/758
(58) Field of Classification Search .................. 707/758, 707/999.003
See application file for complete search history.

(56) References Cited

U.S. PATENT DOCUMENTS

| | | |
|---|---|---|
| 4,701,130 A | 10/1987 | Whitney et al. |
| 4,895,518 A | 1/1990 | Arnold et al. |
| 4,953,106 A | 8/1990 | Gansner |
| 5,119,465 A | 6/1992 | Jack et al. |
| 5,129,043 A | 7/1992 | Yue |
| 5,199,068 A | 3/1993 | Cox |
| 5,259,766 A | 11/1993 | Sack et al. |
| 5,267,865 A | 12/1993 | Lee et al. |
| 5,270,920 A | 12/1993 | Pearse et al. |
| 5,301,270 A | 4/1994 | Steinberg et al. |
| 5,310,349 A | 5/1994 | Daniels et al. |
| 5,311,422 A | 5/1994 | Loftin et al. |

(Continued)

FOREIGN PATENT DOCUMENTS

EP      1132847 A2 *   2/2001

(Continued)

OTHER PUBLICATIONS

Robert Churchill et al. RDF Technical Overview. Mozilla.org. Last Modified 11, 1999. Retrieved from: http://www.mozilla.org/rdf/doc/api.html.*

(Continued)

*Primary Examiner* — Aleksandr Kerzhner
(74) *Attorney, Agent, or Firm* — Hamilton & Terrile, LLP; Kent B. Chambers

(57) ABSTRACT

A method for enterprise application integration that uses "connectors" that can be instantiated via downloading (e.g., using Java® or other such technologies) to provide interfaces to respective disparate database systems. The databases systems may comprise any variety of now or heretofore known systems, e.g. SAP, Oracle, and so forth. The connectors can, for example, translate between a native language (or API) of the respective database systems and an internal language/protocol of the enterprise application integration system. To this end, the connectors can utilize a scripting language to access the respective database systems. Data retrieved from the database systems can be stored in a central data store in the form of RDF triplets, from which directed graphs can be generated for to generate presentations consolidated from the multiple database systems.

22 Claims, 8 Drawing Sheets

U.S. PATENT DOCUMENTS

| | | | |
|---|---|---|---|
| 5,326,270 A | 7/1994 | Ostby et al. | |
| 5,333,254 A | 7/1994 | Robertson | |
| 5,339,390 A | 8/1994 | Robertson | |
| 5,374,932 A | 12/1994 | Wyschogrod | |
| 5,379,387 A | 1/1995 | Carlstedt | |
| 5,381,332 A | 1/1995 | Wood | |
| 5,395,243 A | 3/1995 | Lubin et al. | |
| 5,421,730 A | 6/1995 | Lasker, III et al. | |
| 5,450,480 A | 9/1995 | Man | |
| 5,463,682 A | 10/1995 | Fisher | |
| 5,499,293 A | 3/1996 | Behram et al. | |
| 5,519,618 A | 5/1996 | Kastner | |
| 5,548,506 A | 8/1996 | Srinivasan | |
| 5,579,486 A | 11/1996 | Oprescu | |
| 5,597,312 A | 1/1997 | Bloom et al. | |
| 5,608,789 A | 3/1997 | Fisher | |
| 5,634,053 A | 5/1997 | Noble et al. | |
| 5,655,118 A | 8/1997 | Heindel et al. | |
| 5,732,192 A | 3/1998 | Malin | |
| 5,745,753 A | 4/1998 | Mosher, Jr. | |
| 5,761,063 A | 6/1998 | Jannette et al. | |
| 5,765,140 A | 6/1998 | Knudson et al. | |
| 5,788,504 A | 8/1998 | Rice et al. | |
| 5,795,155 A | 8/1998 | Morrel-Samuels | |
| 5,809,212 A | 9/1998 | Shasha | |
| 5,822,780 A | 10/1998 | Schultzman | |
| 5,826,077 A | 10/1998 | Blakeley et al. | |
| 5,826,252 A | 10/1998 | Wolters, Jr. et al. | |
| 5,829,983 A | 11/1998 | Koyama et al. | |
| 5,832,483 A | 11/1998 | Barker | |
| 5,841,673 A | 11/1998 | Kobayashi | |
| 5,873,076 A * | 2/1999 | Barr et al. | 707/3 |
| 5,875,441 A | 2/1999 | Nakatsuyama et al. | |
| 5,881,269 A | 3/1999 | Dobbelstein | |
| 5,907,837 A | 5/1999 | Ferrel et al. | |
| 5,935,249 A | 8/1999 | Stern et al. | |
| 5,974,441 A | 10/1999 | Rogers et al. | |
| 5,974,443 A | 10/1999 | Jeske | |
| 5,983,267 A | 11/1999 | Shklar et al. | |
| 5,987,415 A | 11/1999 | Breese et al. | |
| 5,995,958 A | 11/1999 | Xu | |
| 6,012,098 A | 1/2000 | Bayeh et al. | |
| 6,035,412 A | 3/2000 | Tamer et al. | |
| 6,044,373 A | 3/2000 | Gladney et al. | |
| 6,044,466 A | 3/2000 | Anand | |
| 6,078,982 A | 6/2000 | Du et al. | |
| 6,085,188 A | 7/2000 | Bachmann et al. | |
| 6,094,652 A | 7/2000 | Faisal | |
| 6,122,632 A | 9/2000 | Botts et al. | |
| 6,125,363 A | 9/2000 | Buzzeo et al. | |
| 6,130,679 A | 10/2000 | Chen | |
| 6,137,797 A | 10/2000 | Bass et al. | |
| 6,144,997 A | 11/2000 | Lamming et al. | |
| 6,151,595 A | 11/2000 | Pirolli | |
| 6,151,624 A * | 11/2000 | Teare et al. | 709/217 |
| 6,154,738 A | 11/2000 | Call | |
| 6,177,932 B1 | 1/2001 | Galdes et al. | |
| 6,182,085 B1 | 1/2001 | Eichstaedt | |
| 6,185,516 B1 | 2/2001 | Hardin | |
| 6,185,534 B1 | 2/2001 | Breese | |
| 6,212,502 B1 | 4/2001 | Ball et al. | |
| 6,240,417 B1 | 5/2001 | Eastwick et al. | |
| 6,243,713 B1 | 6/2001 | Nelson et al. | |
| 6,246,320 B1 | 6/2001 | Monroe | |
| 6,266,668 B1 | 7/2001 | Vanderveldt et al. | |
| 6,308,163 B1 | 10/2001 | Du et al. | |
| 6,330,554 B1 | 12/2001 | Altschuler et al. | |
| 6,341,277 B1 | 1/2002 | Coden et al. | |
| 6,360,330 B1 | 3/2002 | Mutalik et al. | |
| 6,369,819 B1 | 4/2002 | Pitkow | |
| 6,381,738 B1 | 4/2002 | Choi | |
| 6,389,429 B1 | 5/2002 | Kane et al. | |
| 6,389,460 B1 | 5/2002 | Stewart et al. | |
| 6,393,423 B1 | 5/2002 | Goedken | |
| 6,405,211 B1 | 6/2002 | Sokol et al. | |
| 6,405,251 B1 | 6/2002 | Bullard | |
| 6,415,283 B1 | 7/2002 | Conklin | |
| 6,418,413 B2 | 7/2002 | DeMarcken et al. | |
| 6,418,448 B1 * | 7/2002 | Sarkar | 707/104.1 |
| 6,427,151 B1 | 7/2002 | Chan et al. | |
| 6,429,870 B1 | 8/2002 | Chen | |
| 6,437,799 B1 | 8/2002 | Shinomi | |
| 6,446,200 B1 | 9/2002 | Ball | |
| 6,446,256 B1 | 9/2002 | Hyman et al. | |
| 6,463,440 B1 | 10/2002 | Hind et al. | |
| 6,496,833 B1 | 12/2002 | Goldberg et al. | |
| 6,509,898 B2 | 1/2003 | Chi et al. | |
| 6,529,899 B1 * | 3/2003 | Kraft et al. | 707/3 |
| 6,530,079 B1 | 3/2003 | Choi | |
| 6,539,374 B2 | 3/2003 | Jung | |
| 6,542,912 B2 | 4/2003 | Meltzer et al. | |
| 6,546,406 B1 | 4/2003 | Derose et al. | |
| 6,556,983 B1 | 4/2003 | Altschuler et al. | |
| 6,571,222 B1 * | 5/2003 | Matsumoto et al. | 705/80 |
| 6,577,769 B1 | 6/2003 | Kenyon | |
| 6,583,800 B1 | 6/2003 | Ridgley | |
| 6,594,662 B1 | 7/2003 | Sieffert et al. | |
| 6,598,043 B1 * | 7/2003 | Baclawski | 707/3 |
| 6,606,613 B1 | 8/2003 | Altschuler | |
| 6,625,657 B1 | 9/2003 | Bullard | |
| 6,636,848 B1 | 10/2003 | Aridor et al. | |
| 6,640,284 B1 | 10/2003 | Shaw et al. | |
| 6,643,638 B1 | 11/2003 | Xu | |
| 6,643,652 B2 * | 11/2003 | Helgeson et al. | 707/10 |
| 6,678,679 B1 | 1/2004 | Bradford | |
| 6,701,314 B1 * | 3/2004 | Conover et al. | 707/10 |
| 6,721,747 B2 | 4/2004 | Lipkin | |
| 6,725,227 B1 * | 4/2004 | Li | 707/102 |
| 6,751,663 B1 | 6/2004 | Farrell | |
| 6,757,708 B1 | 6/2004 | Craig et al. | |
| 6,772,148 B2 | 8/2004 | Baclawski | |
| 6,778,971 B1 | 8/2004 | Altschuler | |
| 6,792,420 B2 | 9/2004 | Stephen Chen et al. | |
| 6,804,688 B2 | 10/2004 | Kobayashi et al. | |
| 6,901,438 B1 | 5/2005 | Davis et al. | |
| 6,925,457 B2 | 8/2005 | Britton et al. | |
| 6,934,702 B2 * | 8/2005 | Faybishenko et al. | 707/10 |
| 6,963,875 B2 | 11/2005 | Moore et al. | |
| 7,047,411 B1 | 5/2006 | DeMello et al. | |
| 7,117,260 B2 | 10/2006 | Bimson et al. | |
| 7,171,415 B2 * | 1/2007 | Kan et al. | 707/10 |
| 7,289,793 B2 | 10/2007 | Norwood et al. | |
| 7,313,588 B1 * | 12/2007 | Shotton et al. | 709/202 |
| 2001/0047355 A1 | 11/2001 | Anwar | |
| 2002/0042831 A1 * | 4/2002 | Capone et al. | 709/230 |
| 2002/0049603 A1 | 4/2002 | Mehra et al. | |
| 2002/0049788 A1 | 4/2002 | Lipkin et al. | |
| 2002/0059566 A1 * | 5/2002 | Delcambre et al. | 717/146 |
| 2002/0069134 A1 | 6/2002 | Solomon | |
| 2002/0078030 A1 * | 6/2002 | Iwayama et al. | 707/1 |
| 2002/0091678 A1 | 7/2002 | Miller et al. | |
| 2002/0091710 A1 | 7/2002 | Dunham et al. | |
| 2002/0091835 A1 | 7/2002 | Lentini et al. | |
| 2002/0118688 A1 | 8/2002 | Jagannathan | |
| 2002/0120598 A1 | 8/2002 | Shadmon et al. | |
| 2002/0133502 A1 | 9/2002 | Rosenthal et al. | |
| 2002/0143759 A1 | 10/2002 | Yu | |
| 2002/0177232 A1 | 11/2002 | Melker et al. | |
| 2002/0178232 A1 | 11/2002 | Ferguson | |
| 2003/0004934 A1 | 1/2003 | Qian | |
| 2003/0037145 A1 | 2/2003 | Fagan | |
| 2003/0050834 A1 | 3/2003 | Caplan | |
| 2003/0050927 A1 | 3/2003 | Hussam | |
| 2003/0050929 A1 | 3/2003 | Bookman et al. | |
| 2003/0061209 A1 | 3/2003 | Raboczi et al. | |
| 2003/0074352 A1 | 4/2003 | Raboczi et al. | |
| 2003/0074369 A1 | 4/2003 | Scheutze et al. | |
| 2003/0088639 A1 | 5/2003 | Lentini et al. | |
| 2003/0109951 A1 | 6/2003 | Hsiung et al. | |
| 2003/0229529 A1 | 12/2003 | Mui et al. | |
| 2004/0034651 A1 * | 2/2004 | Gupta et al. | 707/102 |
| 2004/0054690 A1 | 3/2004 | Hillerbrand et al. | |
| 2005/0055330 A1 | 3/2005 | Britton et al. | |
| 2005/0060372 A1 | 3/2005 | DeBettencourt et al. | |
| 2005/0125683 A1 | 6/2005 | Matsuyama et al. | |
| 2006/0271563 A1 | 11/2006 | Angelo et al. | |

FOREIGN PATENT DOCUMENTS

| | | |
|---|---|---|
| GB | 2343763 A | 5/2000 |
| WO | WO 97/22096 | 6/1997 |
| WO | WO 98/05018 | 2/1998 |
| WO | WO 98/10399 | 3/1998 |
| WO | WO 98/24020 | 6/1998 |
| WO | WO 99/27460 | 6/1999 |

OTHER PUBLICATIONS

Dan Brickley and Libby Miller. RDF, squish etc. Pub. on the Web Nov. 6, 2000. Retrieved from: http://www.ilrt.bris.ac.uk/discovery/2000/11/QL/QL.txt.*

Dan Brickley et al. SWIPE 0.1 specification. Pub. 2001. Retrieved from: http://rdfweb.org/2001/01/swipe/.*

David Beckett. The Design and Implementation of the Redland RDF Application Framework. Copyright WWW01 May 2-5, 2001. Retrieved from: http://www10.org/cdrom/papers/490/.*

Sergey Melnik et al. Representing Order in RDF. Pub. Jan. 7, 2001. Retrieved from: http://infolab.stanford.edu/~stefan/daml/order.html.*

Mathew Gray. HIVE. Semantic Labeling. May 14, 1999. Retrieved from: http://hive.sourceforge.net/mkgray-thesis/html/node8.html.*

Libby Miller. Aggregating Recommendations using RDF. ILRT. Org. Pub. Jan. 10, 1999.*

Nikki Rogers. SWAD-Europe deliverable 4.2: Semantic Web and Web Services: RDF/XML and SOAP for Web Data Encoding. Year 2001.*

C Jenkins, M Jackson, P Burden, J Wallis—Computer Networks, 1999. Automatic RDF metadata generation for resource discovery.*

Kerstin Forsberg et al. Extensible use of RDF in a business context. Computer Networks: The International Journal of Computer and Telecommunications Networking . Published Jun. 2000.*

S. Alexaki et al. Managing RDF Metadata for Community Webs. Springer Berlin / Heidelberg. vol. 1921/2000.*

Terence Critchlow. Report on XEWA-00: The XML enabled wide-area searches for bioinformatics workshop. ACM> vol. 30 , Issue 1 (Mar. 2001).*

Semantic Web Workshop 2001. Proceedings of the Second International Workshop on the Semantic Web. SemWeb'2001. S. Staab et al. Honkong, China May 2001.*

M. R. Kogalovsky. Systematization of information resources collections in digital libraries. MAIK Nauka/Interperiodica distributed exclusively by Springer Science+Business Media LLC. vol. 26, No. 3 / May 2000.*

Ludascher, B. Gupta, A. Martone, M.E.Model-based mediation with domain maps. Data Engineering, 2001. Proceedings. 17th International Conference on Publication Date: 2001. pp. 81-90. Meeting Date: Apr. 2, 2001-Apr. 6, 2001.*

Berniers-Lee et al. RFC 2396: Uniform Resource Identifiers (URI): Generic Syntax (Aug. 1998) http://www.cs.tut.fi/ .about.jkorpela/rfc/2396/full.html, 23 pages, downloaded on Feb. 20, 2003.

Forgy, Charles L. "Rete: A Fast Algorithm for the Many Pattern/Many Object Pattern Match Problem," Artifical Intelligence vol. 19 (1982) pp. 17-37.

Melnik, Sergey, "Storing RDF in a relational database," http://www-db.stanford.edu/ .about.melnik/rdf/db.html, 5 pages, downloaded on 20/20/2003.

Quinlan, J. R., "Induction of Decision Trees," Machine Learning vol. 1 (1986) pp. 18-106.

Resource Description Framework (RDF) Model and Syntax Specification W3C Recommendation (Feb. 22, 1999) http://www.w3.org.TR/1999/REC-rdf-syntax-19990222/, 34 pages, downloaded on Feb. 20, 2003.

"The Rete Algorithm," http://herzberg.ca.sandia.gov/jess/docs/52/rete.html. 3 pages, downloaded on Feb. 20, 2003.

"Inkling: RDF Query Using SquishQL," downloaded from http://swordfish.rdfweb.org/rdfquery/ on Mar. 20, 2003, 2 pages.

"rdfDB Query Language," downloaded from http://www.guha.com/rdfdb/query.html on Mar. 20, 2003, 4 pages.

"RDQL-RDF Data Query Language," Hewlett-Packard Company, .COPYRGT. 1994-2003, downloaded from http://www.hpl.hp.com/semweb/rdql.htm on Mar. 20, 2003, 3 pages.

Card et al., "Readings in Information Visualizing Using Vision to Think", 1999, Morgan Kaufmann, p. 298.

"The Surveillance and Monitoring Component of the Public Health Information Network", website for the Centers for Disease Control and Prevention, http://www.cdc.gov/nedss, printed Nov. 14, 2005, 2 pages.

"An Overview of the NEDSS Initiative", website for the Centers for Disease Control and Prevention, http://www.cdc.gov/nedss/About/overview.html, printed Nov. 14, 2005, 2 pages.

"Background on Public Health Surveillance", website for the Centers for Disease Control and Prevention, http://www.cdc.gov/nedss/About/purpose.htm, printed Nov. 14, 2005, 3 pages.

"Description of the NEDSS Base System," Mar. 28, 2001, 5 pages.

"NEDSS Base System Fact Sheet", website for the Centers for Disease Control and Prevention, 2 pages.

"NEDSS Logical Data Model (NLDM) Overview and Users' Guide", Version 1.0, 92 pages.

"NEDSS Systems Architecture", Version 2.0, Apr. 15, 2001, 5 pages.

"NEDSS and NEDSS PAMs Business Discovery Statement", Version 1.2, Mar. 9, 2002, 23 pages.

"Overview of PHIN", Centers for Disease Control and Prevention website, http://www.cdc.gov/phin, printed Jan. 18, 2005, 3 pages.

Public Health Information Network, The Association of State and Territorial Health Officials website, http://www.astho.org/?template=public$_{13}$health_info_network.html, printed Jan. 18, 2005, 2 pages.

"Maestro™ Public Health Suite," Orion International website, http://www.orionhealth.com/maestro_overview.htm, printed Jan. 18, 2005, 3 pages.

Published International Search Report (published May 24, 2007) and Written Opinion (mailed Feb. 12, 2007) for PCT/US05/005725.

Larry Kerschberg, Knowledge Management in Heterogeneous Data Warehouse Environment, Pub. 2001.

Gregory Karvounarakis et al., "Querying Community Web Portals", Sigmod Pub, Pub. 2000.

Bernd Amann et al., Integrating ontologies and thesauri for RDF schema creation and metadata querying, Mar. 6, 2001.

"Resource Description Framework (RDF) Model and Syntax Specification", W3C Recommendation, Feb. 22, 1999.

Supplemental European Search Report dated Aug. 21, 2007 (5 pages).

Miller, Eric et al., RDF Primer, W3C @@ Editor's Draft Jan. 27, 2002 @@, Copyright 2001, 2002 (MIT,INRIA, Keio) (22 pages).

Six, Janet, M. et al, "Effective e Graph Visualization Via Node Grouping", Proceedings of the IEEE Symposium on Information Visualization 2001 (INFOVIS'01) (8 pages).

Gandon, Fabien et al. "A Multi-Agent System to Support Exploiting an XML-based Corporate Memory" INRIA, ACACI Project, 2004 Route des Lucioles, 06902 Sophia Antipolis, France, Proc. of the Third Int. Conf. on Practical Aspects of Knowledge Management (PAKM2000) Basel, Swwitzerland, Oct. 30-31, 2000, (U.Reimer, ed.).

Thompson, Craig "Workshop on Compositional Software Architectures Workshop Report," Software Engineering Notes, vol. 23. No. 3, May 1998.

Takeda, Koichi, "Site Outlining," IBM Research, Tokyo Research Lab, 1623-14.

Bucher, Alex et al. "Discovering Internet Marketing Intelligence through Online Analytical Web Usage Mining," SIGMOD Record, vol. 27, No. 4, Dec. 1998.

Ouksel, Aris et al. "Semantic Interoperability in Global Information Systems," SIGMOD Record, vol. 28, No. 1, Mar. 1999.

Sycara, Katia et al. "Dynamic Service Matchmaking Among Agents in Open Information," SIGMOD Record, vol. 28, No. 1, Mar. 1999.

Buneman et al "Interaction between Path and Type Constraints" PODS 1999.

Swick, Ralph, "RDF:Weaving the Web of Discovery," Putting it Together, Jun. 1999.

Suciu, Dan "Managing Web Data," AT&T Labs-Research, SIGMOD 1999.

Crestani, Fabio "Vocal Access to a Newspaper Archive: Design Issues and Preliminary Investigations," International Computer Science Institute.

McGrath et al, "Digital Library Technology for Locating and Accessing Scientific Data," DL99 Berkeley ACM 1999.
Thomas Lee, et al "Information integration with attribution support for corporate profiles," CIKM99, Nov. 1999 ACM 99.
Tudhope et al "Semantically Indexed Hypermedia: Linking Information Disciplines," ACM 2000, www.comp.glam.ac.uk/people/staff/dstudhope.
Bonifati, "Comparative Analysis of Five XML Query Languages," SIGMOD Record, vol. 29, No. 1, Mar. 2000.
Carr, Leslie et al. "The Evolution of Hypertext Link Services," ACM 2000 0360/99/12es.
Fan, W enfei, "Integrity Constraints for XML," ACM 2001 1-58113-218-x/00/05.
Chen, James et al "A Distributed Multi-Agent System for Collaborative Information Management and Sharing," RBAC 2000, Berlin, Germany ISBN 1-58113-259-x/00/07.
Melnik, Sergey "A Mediation Infrastructure for Digital Library Services," Digital Libraries, San Antonio, TX ACM 2000-581 13-231 x/00/0006.
Melnik, Sergey "Building a Distributed Full-Text Index of the Web," WWW10, May 1-5, 2001, Hong Kong ACM 1-58113-348-0/01/00005.
Semantic Web Workshop: Models, Architectures and Management, Sep. 21, 2000 Conference Review, Intelligence Summer 2001.
Brickley, Dan "Semantic Web History: Nodes and Arcs 1989-1999," The WWW Proposal and RDF, revised Mar. 2001 http:www.w3.org/1999/11/11-WWWProposal/.
Halpin, Harry et al "W3C Semantic Web Activity," W3C Sematic Web, http://www.w3.org/2001/sw/.
Prudhommeaux, Eric "Check and Visualize you RDF," W3C website, Feb. 15, 2007, http://www.w3.org/RDF/Validator/.
RDF Interest Group 1999-2004, W3C Sematic Web, http://www.w3.org/RDF/Interest/.
Berners-Lee, Tim "Information Management: A Proposal," Mar. 1989, May 1990.
Beckett, Dave Dave Beckett's Resource Description Framework (RDF) Resource Guide, available at http://planetrdf.com/guide, last updated Sep. 23, 2005, 26 pages.
Brickley, Dan "RDF Query in Javascript demo," W3C website, Jul. 28, 2001, http://www.w3.org/1999/11/11-WWWProposal/rdfqdemo.html.
Extensible Markup Language (XML), W3C Sematic Web, http://www.w3.org/XML/.
Berniers-Lee et al, "The Enquire Manual," Oct. 1980, http://infomesh.net/2001/enquire/manual/.
Dublin Core Metadata Initiative, available at http://dublincore.org, web page last updated Mar. 31, 2009, 1 page.
Resource Description Framework, (RDF) Schema Specification, W3C Proposed Recommendation Mar. 3, 1999, http://www.w3.org/TR/1999/PR-rdf-schema-19990303/.
Berners-Lee et al "Web Architecture: Describing and Exchanging Data," W3C Recommendations, Jun. 7, 1999, http://www.w3.org/1999/06/07-WebData.
Berners-Lee, "Semantic Web Road Map," W3C Recommendations, Sep. 1998, http://www.w3.org/DesignIssues/Semantic.html.
Lassila, et al "Resource Description Framework (RDF) Model and Syntax Specification," W3C Recommendations, Feb. 22, 1999.
Berners-Lee, "What a semantic web can represent," W3C Recommendations, Sep. 1998, http://www.w3.org/DesignIssues/RDFnot.html (3 of 8)Sep. 27, 2004 1:30:09 PM.
Fensel, D. "Ontobroker: Or How to Enable Intelligent Access to the WWW," Proceedings of the 11th Banff Knowledge Acquisition for Knowledge-Based System Workshop (KAW98), Banaff, Kanada, Apr. 1998.
Swick, R. "The Cambridge Communique," W3C Recommendations, Oct. 1999, http://www.w3.org/TR/schema-arch.
Technical Reports and Communications, W3C website, Apr. 17, 2009, http://www.w3.org/TR/.
Bray, Tim et al. "Extensible Markup Language," W3C Recommendations, Feb. 10, 1998, http://www.w3.org/TR/1998/REC-xml-19980210.
Cowan, John et al. "XML Information Set," W3C Recommendations, May 17, 1999, http://www.w3.org/TR/1999/WD-xml-infoset-19990517.
Extensible Markup Language Activity Statement, W3C Ubiquitous Web, http://www.w3.org/XML/Activity#core-wg.
Clark, James Editor "XSL Transformations," W3C Recommendations, Nov. 16, 1999, http://www.w3.org/TR/xslt.
Manola, Frank Editor "RDF Primer," W3C Working Draft, Mar. 2002, http://www.w3.org/TR/2002/WD-rdf-primer-20020319/.
Malhotra, Ashok et al., "XML Schema Requirements," W3C Note, Feb. 15, 1999, http://www.w3.org/TR/NOTE-xml-schema-req.
Ludascher, B. Gupta, A. Marione, M.E.Model-based mediation with domain maps. Data Engineering, 2001. Proceedings. 17th International Conference on Publication Date: 2001. pp. 81-90. Meeting Date: Apr. 2, 2001-Apr. 6, 2001.
S. Alexaki et al. Managing RDF Metadata for Community Webs. Springer Berlin / Heidelberg. vol. 1921/2000, pp. 140-151.
Sergey Melnik and Stefan Decker, "A Layered Approach to Information Modeling and Interoperability on the Web", Database Group, Stanford Univ., Sep. 4, 2000, 13 pages.
Dan Brickley and Libby Miller, "RDF, SQL and the Semantic Web—A Case Study", www.ilrt.org/discovery/2000/10/swsql/, latest version Nov. 8, 2000 (initial draft Oct. 31, 2000), 8 pages.
Omelayenko, B., "Learning of Ontologies for the Web: the Analysis of Existent Approaches" Proceedings of the International Workshop on Web Dynamics Held in Conj. with the 8th Internationsl Conference on Database Theory Jan. 3, 2001 pp. 1-10, XP002378744, London, UK.
Nick, Z.Z. et al., "Web Search Using a Genetic Algorithm" IEEE Internet Computing, vol. 5, No. 2, Mar. 2001, pp. 18-26, XP002378745, USA.
Supplemental European Search Report for European Application No. 02736950.3 dated May 19, 2006, 4 pages.
European Patent Office Communication Pursuant to Article 96(2) for European Applicaiton No. 02741744.2, dated Dec. 8, 2006, 12 pages.
International Search Report for International Appliaction No. PCT/US05/05725, dated Feb. 12, 2007, (9 pages).
Shankar, Ravi D. et al., "Epoch: an Ontological Framework to Support Clinical Trials Management", [1]Stanford Medical Informatics, Stanford University School of Medicine, Stanford, CA, USA, [2]The Immune Tolerance Network, Pittsburgh, PA, USA, pp. 25-32, Nov. 11, 2006, Copyright 2006United States ,pp. 423-429 ,Year of Publication: 1999 , ISBN:1-58113-146-1.

* cited by examiner ically:
METHODS AND APPARATUS FOR ENTERPRISE APPLICATION INTEGRATION This application is a continuation of U.S. patent application Ser. No. 09/917,264, filed Jul. 27, 2001, entitled "Methods and Apparatus for Enterprise Application Integration" (the teachings of which are incorporated herein by reference), which claims the benefit of priority of U.S. Provisional patent application Ser. No. 60/291,185, filed May 15, 2001, entitled "Methods and Apparatus for Enterprise Application Integration." The teachings of the foregoing applications are incorporated herein by reference.

BACKGROUND OF THE INVENTION

The invention pertains to digital data processing and, more particularly, to methods and apparatus for enterprise application integration. It has application in the dynamic consolidation of disparate databases, e.g., of marketing, e-commerce or other transactional data, over a network, such as the Internet.

It is not uncommon for a single company to have several database systems—separate systems not interfaced—to track internal and external planning and transaction data. Such systems might of been developed at different times throughout the history of the company and are therefore of differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise application integration (EAI) is the consolidation of these disparate legacy databases with one another and with newer e-commerce databases. For instance, inventory on-hand data gleaned from a legacy ERP system may be difficult to combine with customer order data gleaned from web servers that support e-commerce (and other web-based) transactions. This is not to mention difficulties, for example, in consolidating resource scheduling data from the ERP system with the forecasting data from the marketing database system.

An object of this invention is to provide improved methods and apparatus for digital data processing and, more particularly, for enterprise application integration.

A further object of the invention is to provide such methods and apparatus as can be readily and inexpensively integrated with legacy, current and future database management systems.

A still further object of the invention is to provide such methods and apparatus as can be implemented incrementally or otherwise without interruption of enterprise operation.

Yet a still further object of the invention is to provide such methods and apparatus as to facilitate ready access to up-to-date enterprise data, regardless of its underlying source.

Yet still a further object of the invention is to provide such methods and apparatus as permit flexible presentation of enterprise data in an easily understood manner.

SUMMARY OF THE INVENTION

The aforementioned are among the objects attained by the invention, one aspect of which provides a method for enterprise application integration that uses software ("connectors") that can be instantiated via downloading (e.g., using Java® or other such technologies) to provide interfaces to respective disparate database systems. The databases systems may comprise any variety of now or heretofore known systems, e.g. SAP, Oracle, and so forth.

The connectors can, for example, translate between a native language (or API) of the respective database systems and an internal language/protocol of the enterprise application integration system. To this end, the connectors can utilize a scripting language to access the respective database systems.

Another aspect of the invention provides methods as described above that store data accessed from the database systems in a central data store, referred to below as a "holographic" data store. That data can be stored, for example, as resource definition framework (RDF) triplets.

The connectors, according to further aspects of the invention, can query the respective database systems based on requests received from the holographic data store and/or from a framework server, a user or otherwise. In related aspects, the data store is periodically updated via application of queries to the database systems.

Further aspects of the invention provide methods as described above in which a graph generator generates directed graphs from the RDF triplets in the holographic store. The graphs can be "walked" in order to discern answers to queries for information reflected by triplets originating from data in one or more of the databases.

Another aspect of the invention provides methods as described above in which a framework server accepts queries, e.g., from a user, and formats them for application to the holographic data store.

Further aspects of the invention provide enterprise application integration systems that operate in accord with the foregoing.

These and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which.

DETAILED DESCRIPTION OF THE ILLUSTRATED EMBODIMENT

Figure 1:
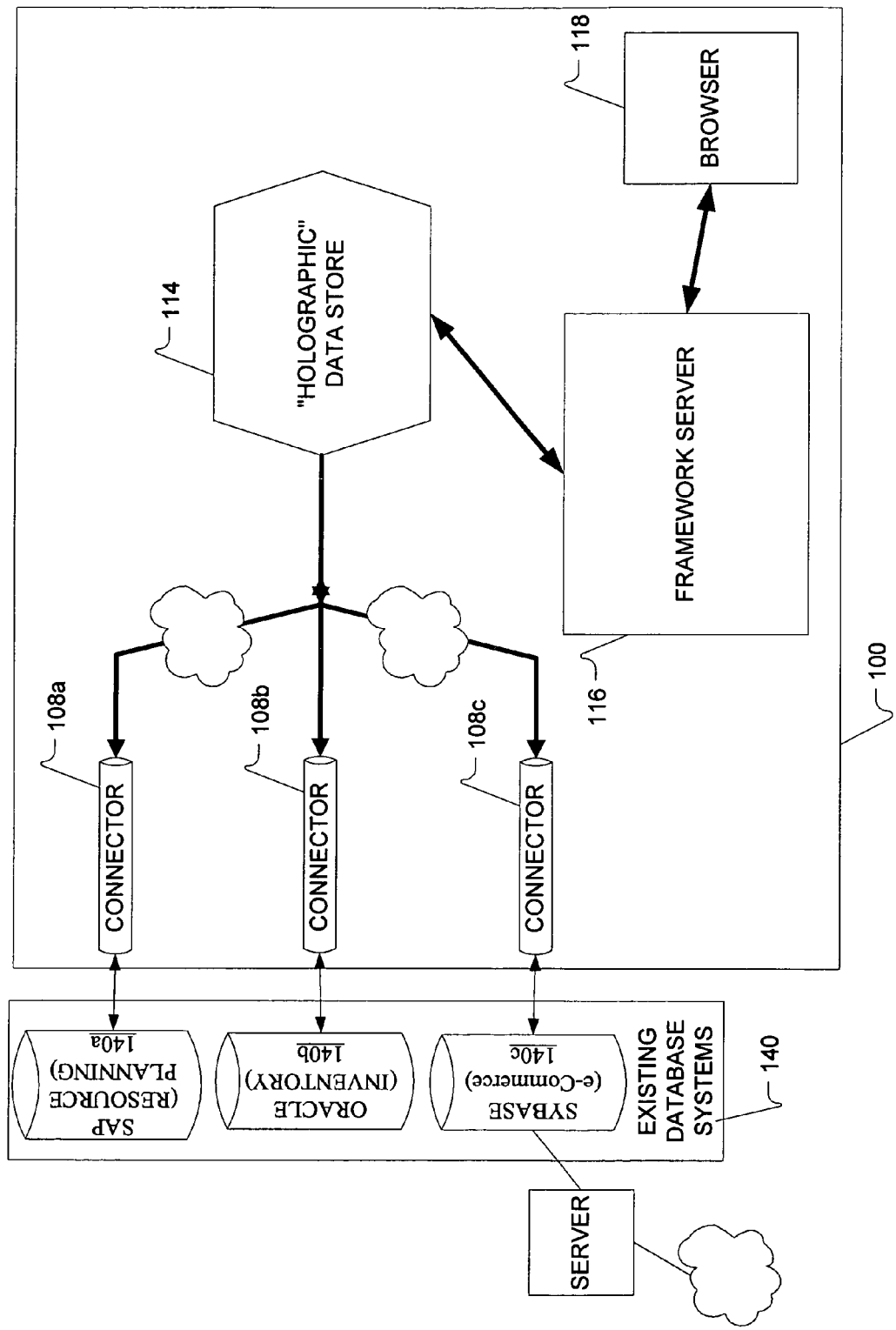
FIG. 1 depicts an improved enterprise application integration system according invention.

FIG. 1 depicts a enterprise application integration system according to the invention. The illustrated system 100 includes connectors 108 that provide software interfaces to legacy, e-commerce and other databases 140 (hereinafter, collectively, "legacy databases"). A "holographic" database 114 (hereinafter, "data store" or "holographic data store"), which is coupled to the legacy databases 140 via the connectors 108, stores data from those databases 140. A framework server 116 accesses the data store 114, presenting selected data to (and permitting queries from) a user browser 118. The server 116 can also permit updates to data in the data store 114 and, thereby, in the legacy databases 140.

Legacy databases 140 represent existing (and future) databases and other sources of information in a company, organization or other entity (hereinafter "enterprise"). In the illustration, these include a retail e-commerce database (e.g., as indicated by the cloud and server icons adjacent database 140c) maintained with a Sybase® database management system, an inventory database maintained with an Oracle® database management system and an ERP database maintained with an SAP® database management system. Of course, these are merely examples of the variety of databases or other sources of information with which methods and apparatus as described herein can be used. Common features of illustrated databases 140 are that they maintain information of interest to an enterprise and that they can be accessed via respective software applications program interfaces (API) or other mechanisms known in the art.

Connectors 108 serve as an interface to legacy database systems 140. Each connector applies requests to, and receives information from, a respective legacy database, using that database's API or other interface mechanism. Thus, for example, connector 108a applies requests to legacy database 140a using the corresponding SAP API; connector 108b, to legacy database 140b using Oracle API; and connector 108c, to legacy database 140c using the corresponding Sybase API.

In the illustrated embodiment, these requests are for purposes of accessing data stored in the respective databases 140. The requests typically originate in the holographic data store 114 or the framework server 116, wherefrom they are routed to the connectors via the store 114. Alternatively or in addition, the requests can originate, in the first instance, from the connectors 108 themselves, e.g., by way of pre-programming or otherwise. Regardless of their origin, the requests can be stored in the connectors 108 for application and/or reapplication to the respective legacy databases 108.

Data and other information (collectively, "messages") generated by the databases 140 in response to the requests are routed by connectors to the holographic data store 114. Those messages can be cached by the connectors 108, though, they are preferably immediately routed to the store 114.

The software connectors 108 may reside on any digital data processing system(s) that is (are) in communications coupling—e.g., via a dial-up connection, bus, cable, network and/or Internet (as indicated by cloud icons), or otherwise—with the respective legacy databases 140 and with the holographic data store 114. Typically, the connectors reside on computers within the firewall (or other security barrier) of the enterprise, though, they may reside elsewhere (e.g., local to the holographic store 114 and/or the framework server 116).

In a preferred embodiment, the connectors are implemented as Java® servlets, or the like, though they can be implemented in any programming language. Indeed, the connectors fabricated as special purpose hardware devices, though, such hardware lacks one of the immediate advantages of Java (or other software) implementations—to wit, the ability to download and/or remotely implement, upgrade and maintain it.

In embodiments, such as that illustrated here, wherein the connectors 108 are implemented as Java® servlets, or the like, those connectors preferably execute with a suitable environment. e.g., utilizing Java virtual machines running scripted Extensible Markup Language ("XML") operating according Extensible Stylesheet Language Transformation ("XSLT") scripts. A suitable environment for accomplishing this is Tomcat running under Cocoon 2, both available as from Apache Software Foundation or in the alternative, WebSphere available from IBM Corporation. As such, the use of XSLT scripts allow the connector to communicate with a variety of database systems by merely downloading the XSLT using any computer readable medium, e.g. disk, electronic download, or CD-ROM.

Figure 2:
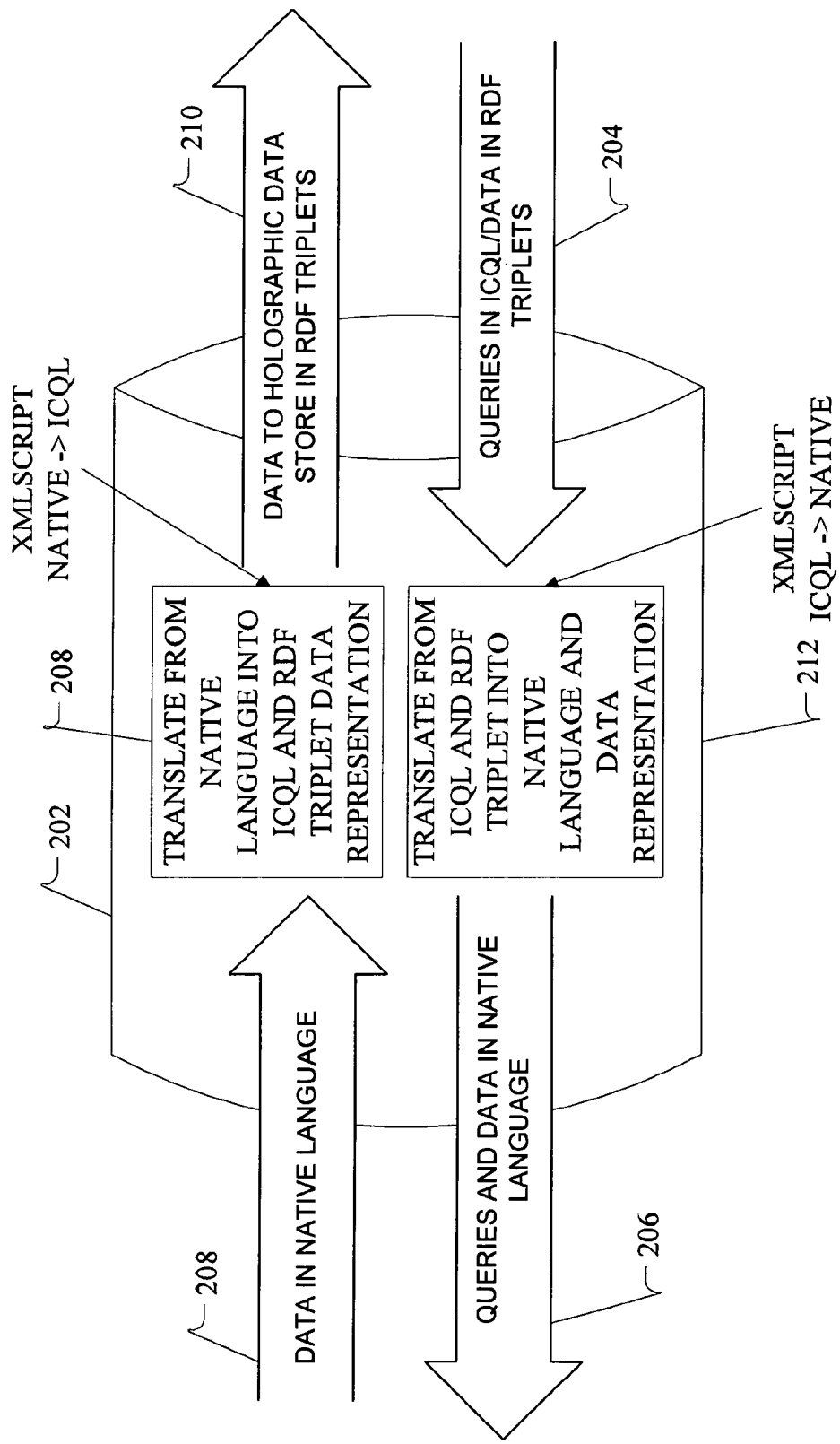
FIG. 2 depicts operation of a software interface "connector" according to the invention.

Referring to FIG. 2, the connectors translate between the API (or other interface mechanisms) of the legacy databases 140 and a language/protocol common to the connectors 108, the holographic data store 114 and the framework server 116. In the illustrated embodiment, that common language/protocol is referred to Intelligent Connector Query Language (ICQL), though, it will be appreciated that other embodiments may use other languages/protocols and, indeed, may not utilize a common language/protocol at all. Thus, for example, requests generated by holographic data store 114 and routed to connector 108a in ICQL (or other language/protocol) are converted (or translated or transformed) by that connector into an appropriate API call to legacy database 140a. Likewise, messages generated by that database 140a in response to such a request are converted by the connector 108a back into ICQL (or other language/protocol).

Figure 3:
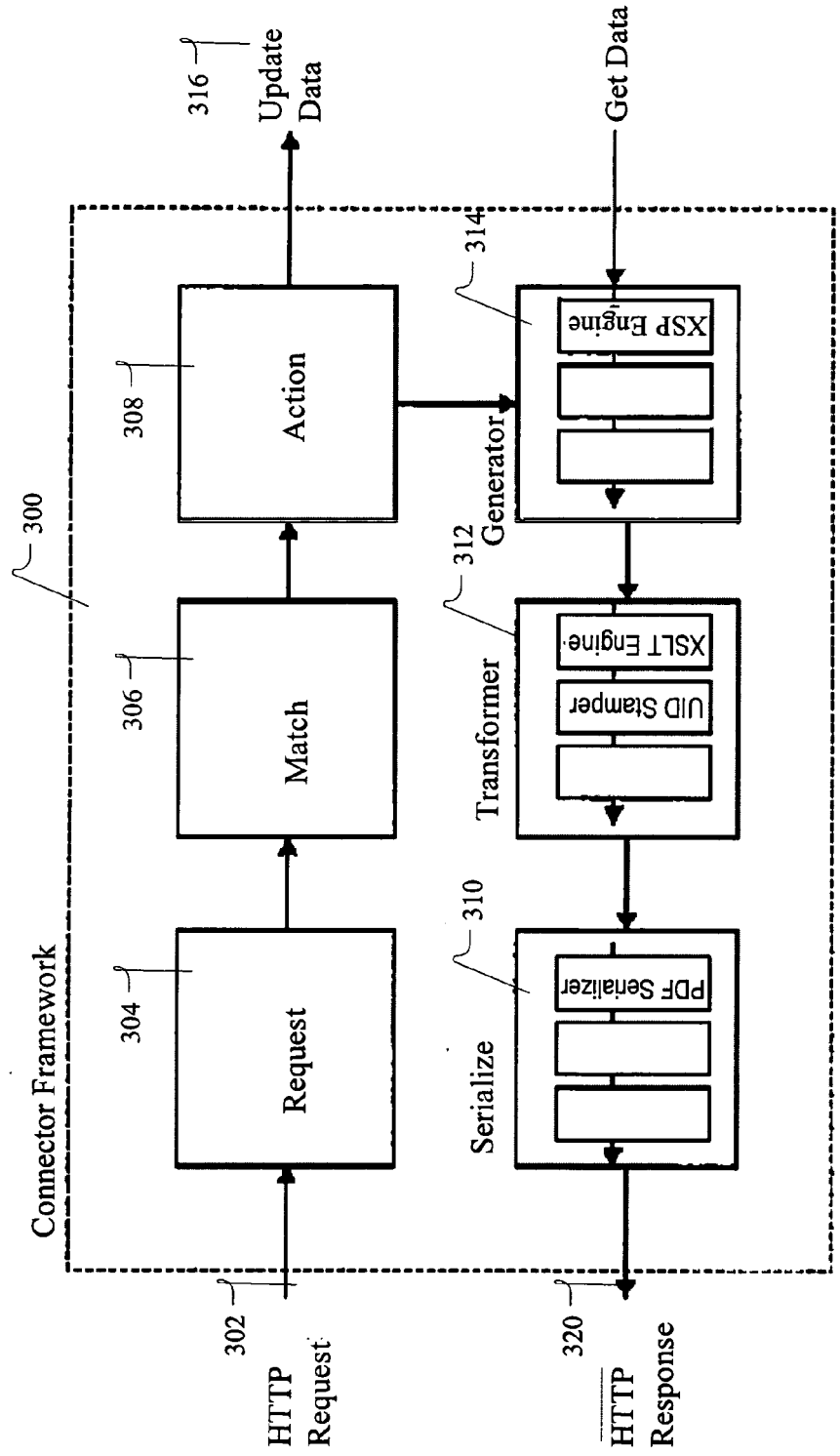
FIG. 3 depicts data flow within a connector according to the invention.

A more complete understanding of the operation of the connectors 108 may be attained by reference to FIG. 3, which shows data flow within a connector 300 according to one embodiment of the invention.

Illustrated is a connector 300 utilizing Hypertext Transfer Protocol ("HTTP") as a vehicle to transfer messages (e.g., requests and responses thereto) with holographic data store 114, such as the one illustrated in FIG. 1. Each message 302 (e.g., request) originating from the data store 115 is processed by request, match and action modules 304-308, as shown. The message is sent to the connected legacy database, e.g., 140a, using the appropriate API or other interface mechanism. It will be apparent to those of ordinary skill in the art that the actual transformation sequence is dependent on the type of legacy database system being accessed and the method of communication between the holographic data store and the connector framework.

Messages received by the connector 300 from the legacy database are likewise processed for return to the holographic data store 114. In the illustrated example, a message 318 is received and routed to a generator module 314 which performs a transformation according to a XSP script, and then routes the message to a transformer module 312. The transformer module 302 transforms the data field contained within the message into RDF triplet form suitable for the holographic data store 114 to catalog, and assigns a unique Universal Identification Number ("UID") for later conversion into a Universal Resource Locator ("URL") by the data store 114. Finally, the message is routed to a serializer module 310 and transformed for HTTP transfer to the holographic data store 320.

Through use a connector framework comprised of selectable modules, the connectors may be electronically downloaded or otherwise remotely updated as required. Moreover, multiple engines/modules can be inserted in the internal data pipeline of connector 300. Each such module transforms the data and passes it along the stream.

Referring back to FIG. 1, the holographic data store 114 stores data from the legacy databases 140 and from the framework server 116 as RDF triplets. The data store 114 can be embodied on any digital data processing system or systems that are in communications coupling (e.g., as defined above) with the connectors 108 and the framework server 116 capable of supporting Java® running XML/XSLT as defined above. Typically, the data store 114 is embodied in a workstation or other high-end computing device with high capacity storage devices or arrays, though, this may not be required for any given implementation.

Though the holographic data store 114 may be contained on an optical storage device, this is not the sense in which the term "holographic" is used. Rather, it refers to its storage of data from multiple sources (e.g., the legacy databases 140) in a form which permits that data to be queried and coalesced from a variety of perspectives, depending on the needs of the user and the capabilities of the framework server 116. To this end a preferred data store 114 stores the data from the legacy databases 140 in object-predicate-subject form, e.g., RDF triplets, though those of ordinary skill in the art will appreciate that other forms may be used as well, or instead.

Figure 4:
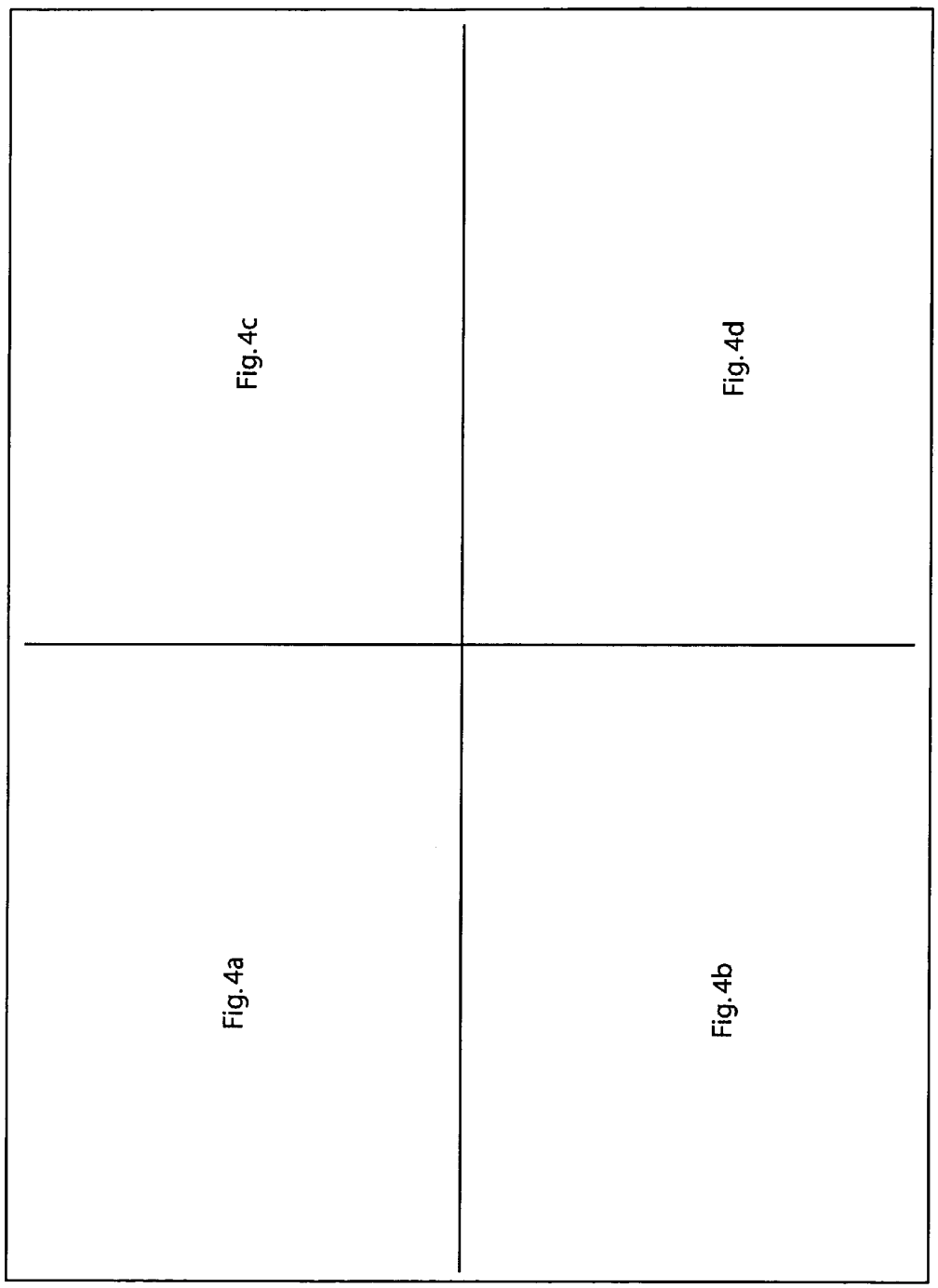
FIGS. 4, 4a, 4b, 4c, 4d depict a directed graph representing data triplets of the type maintained in a data store according to the invention.
Figure 4A:
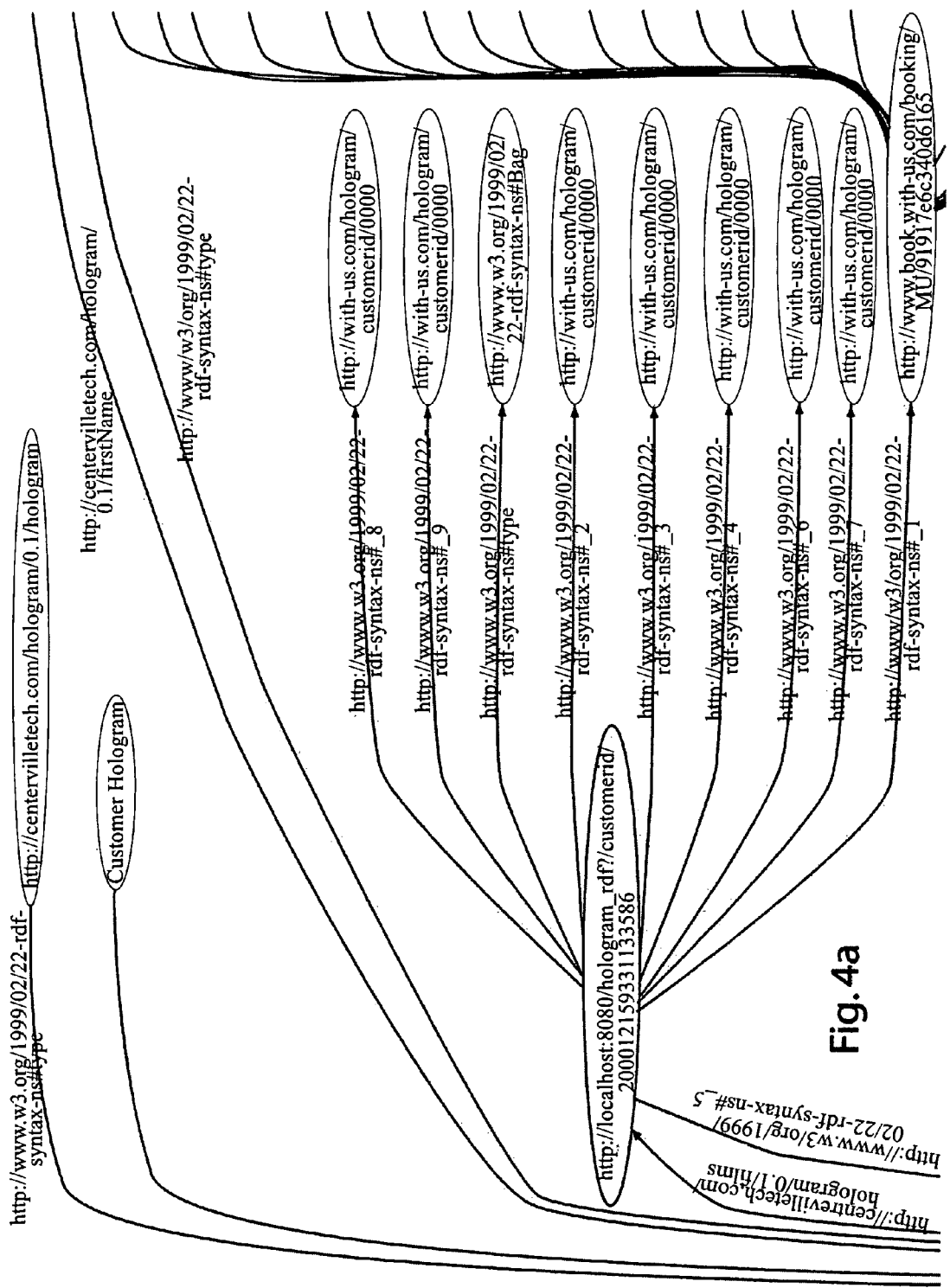
Figure 4B:
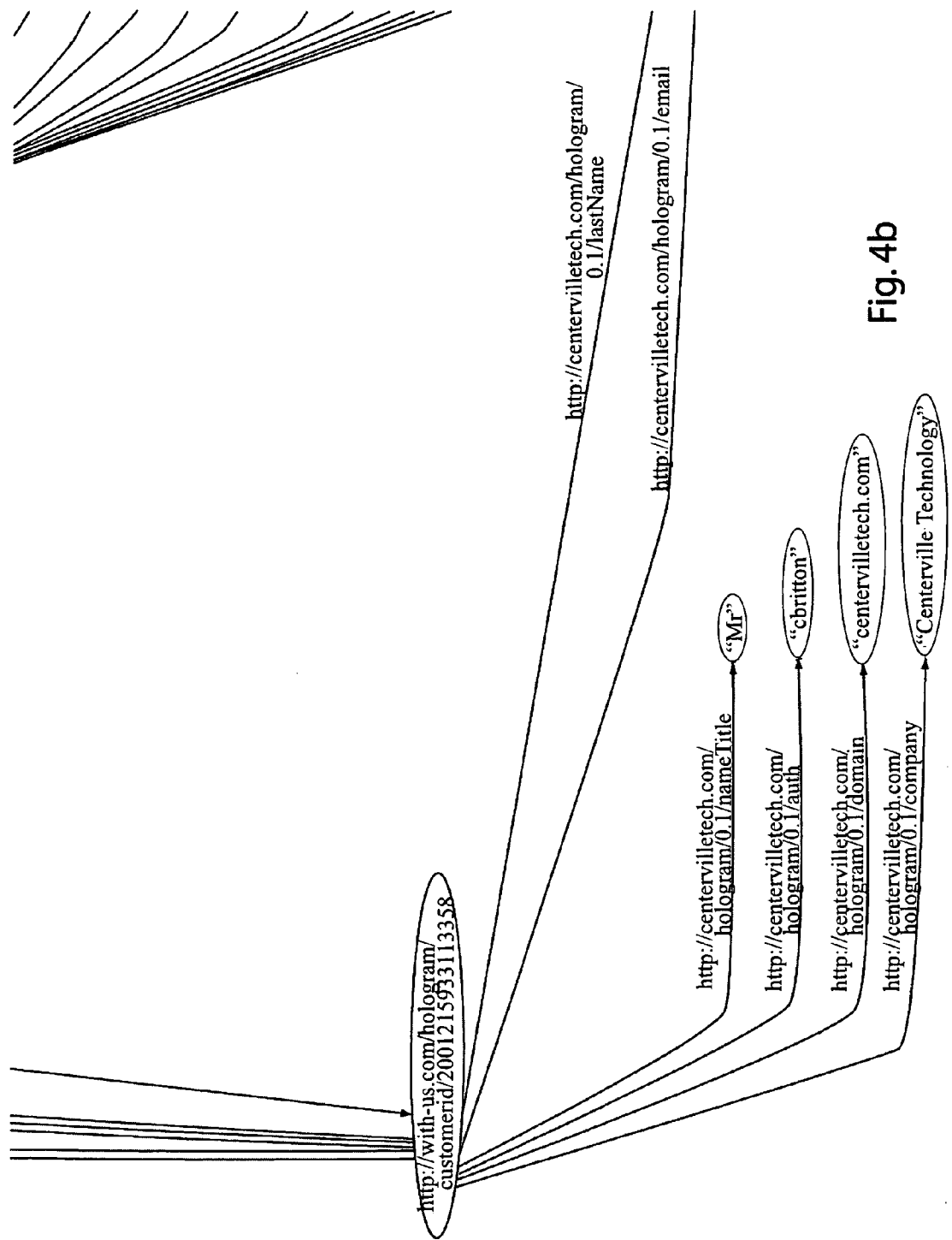
Figure 4C:
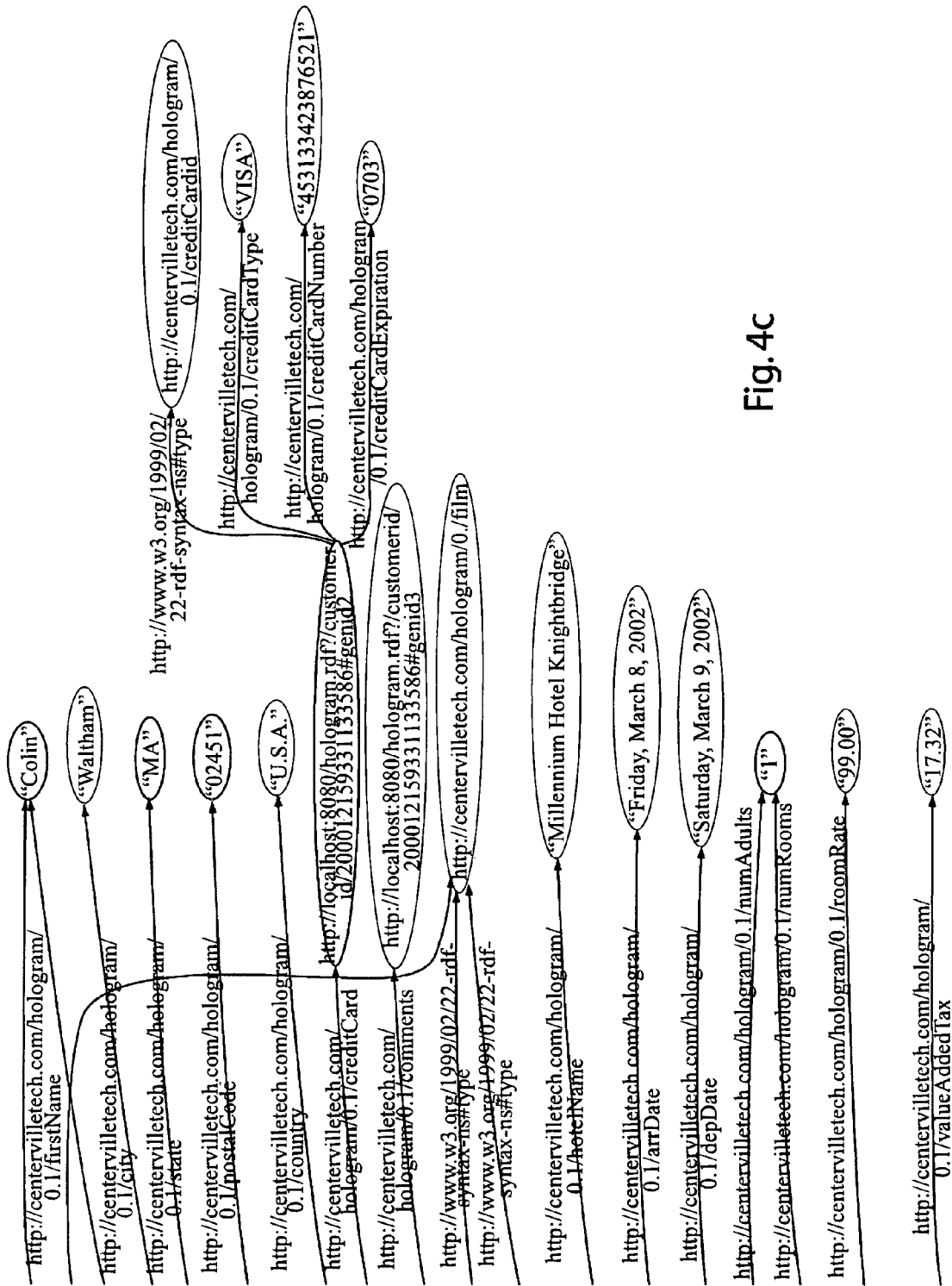
Figure 4D:
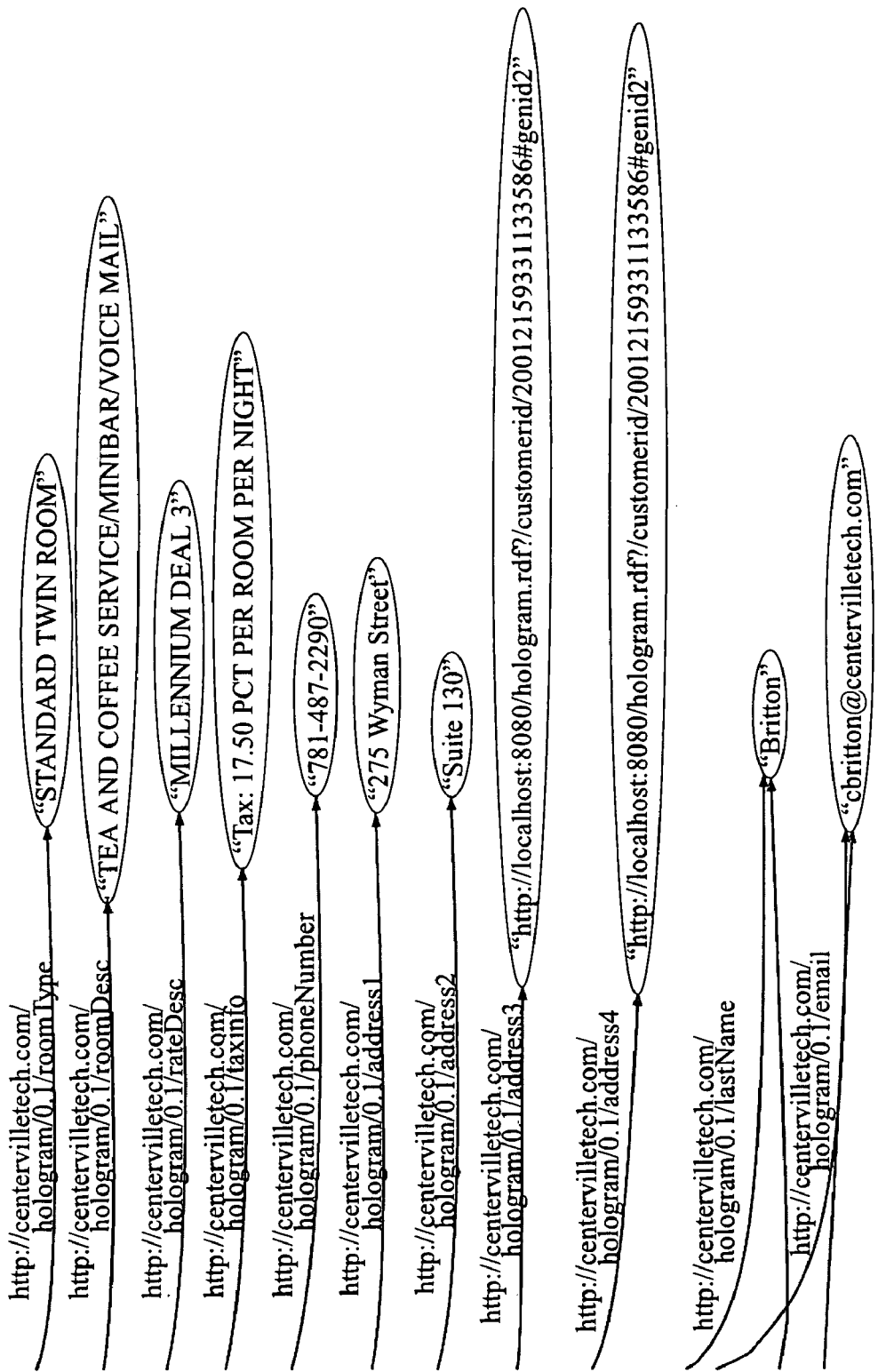

Referring to FIG. 4, the data store can store—by way of non-limiting example—RDF triplets representing data from marketing and/or e-commerce "legacy" databases. The figure particularly illustrates triplets representing hotel reservation transactions. Each triplet comprises a predicate 402, subject 406 and object 408 such that the object 408 is "linked" to its subject(s) 406 via predicate(s) 402.

In the illustrated example, each predicate 402 is assigned a Uniform Resource Indicator ("URI") 410 such that related data is located via URI's in a hierarchical ordering, represented for example by the directed arrow 402. If the triplet is high-level 408 its URI 404 points to a lower set of triplets 412, each of which has a URI 414 that may point to data or to further triplets 416.

Each subject 406 contains transactional information pertaining to an enterprise resource item, e.g. credit card type, type of product bought or date. For example, as illustrated in FIG. 4, a typical subject 420 shows a value of "data of departure" related to a hotel booking transaction. It can be appreciated from one in the art that many different types of data may be contained within the subject, e.g. literal values, referenced values or additional URI's.

An object 408 contains information pertaining to the "who" of the transaction, such as the person or enterprise initiating the transaction. The object, similar to the subject, may be a literal, e.g. "Smith", or a unique identifier such as a locator address 422 such that each related predicate and subject can be referenced through the object.

It can be appreciated that any given transaction (or other event that gives rise to triplets of the type stored in the data store 114) may be reflected in multiple legacy database systems 140. When those systems are queried by the connectors, this may result in multiple triplets causing redundant or related information to be stored within the holographic store 114. The illustrated data store 114 includes a relationalizer that periodically passes through the retained triplets to combine these related triplets into "bags," at the same time removing any redundancies as determined by a calculated confidence level or other similar technique. This can be performed by comparing sequential levels of objects and merging triplets and bags of similar objects. For example, two people at the same address and same last name may be merged into a "family" bag, and so on. In this way, data storage is both minimized and related such that queries can be executed using the minimal execution time. The data store 114 can also remove redundant information from the legacy databases 140 in a similar manner dependent on the capabilities of the specific database.

The data store 114 includes a graph generator (not shown) that uses the stored triplets to generate directed graphs in response to queries (e.g., in ICQL form) from the framework server 116. These may be queries for information reflected by triplets originating from data in one or more of the legacy databases 140 (one example might be a request for the residence cities of hotel guests who booked reservations on account over Independence Day weekend as reflected by data from an e-Commerce database and an Accounts Receivable database). Such generation of directed graphs from triplets can be accomplished in any conventional manner known the art (e.g., as appropriate to RDF triples or other manner in which the information is stored). Directed graphs generated by the data store are passed back to the server 116 for presentation to the user.

In the event that the data store 114 does not include sufficient information (e.g., triplets) necessary to respond to a query from the framework server 116, it can pass the query directly to the connectors 108 for application to the legacy databases 140. Alternatively or in addition, the data store 114 can construct further queries necessary to "fill out" the triplet store with legacy database information necessary to respond to the query.

In a preferred embodiment, illustrated data store 114 polls the legacy database systems 140 (via connectors 108) to obtain current information at pre-determined intervals, times or otherwise. This can be accomplished using the queries stored within the data store 114 or the connectors 108 themselves.

Referring back to FIG. 1, the framework server 116 generates requests to the data store 114 (and/or indirectly to the legacy databases via connectors 108, as discussed above) and presents information therefrom to the user via browser 118. The requests can be based on ICQL requests entered directly by the user though, preferably, they are generated by the server 116 based on user selections/responses to questions, dialog boxes or other user-input controls. In a preferred embodiment, the framework server includes one or more user interface modules, plug-ins, or the like, each for generating queries of a particular nature. One such module, for example, generates queries pertaining to marketing information, another such module generates queries pertaining to financial information, and so forth.

In addition to generating queries, the framework server (and/or the aforementioned modules) "walks" directed graphs generated by the data store 114 to present to the user (via browser 118) any specific items of requested information. Such walking of the directed graphs can be accomplished via any conventional technique known in the art. Presentation of questions, dialog boxes or other user-input controls to the user and, likewise presentation of responses thereto based on the directed graph can be accomplished via conventional server/browser or other user interface technology.

In some embodiments, the framework server 116 permits a user to update data stored in the data store 114 and, thereby, that stored in the legacy databases 140. To this end, changes made to data displayed by the browser 118 are transmitted by server 116 to data store 114. There, any triplets implicated by the change are updated and forwarded to the respective legacy databases 140, which utilize the corresponding API (or other interface mechanisms) to update their respective stores.

In some embodiments, the server 116 can present to the user not only data from the data store 114, but also data gleaned by the server directly from other sources. Thus, for example, the server 116 can directly query an enterprise website for statistics regarding web page usage, or otherwise.

A further understanding of the operation of the framework server 116 and of the illustrated embodiment may be attained by reference to the appendix filed herewith.

Described herein are methods and apparatus meeting the above-mentioned objects. It will be appreciated that the illustrated embodiment is merely an example of the invention and that other embodiments, incorporating changes to those described herein, fall within the scope of the invention.

Appendix to

Patent Application for

METHODS AND APPARATUS FOR ENTERPRISE APPLICATION INTEGRATION

XML Specification for Defining Marketing Framework Components
April 11, 2001 — Draft, v0.5 access to a particular pipe, it is assumed that the user is authorized and authenticated through all of the operations of a pipe.

A selector is passed the name of the desired functional module and the name of the organization. The module name is also the name of the XML document containing the structure of the page to be rendered.

The XML document follows the structure of the page, like so:

```
<xml>
<module>
        (This section describes the name, organization, & logo information for this module)

<section>
        (This section describes any menus or button bars that appear in the page header)
    </section>

<sub_section>
        (This section describes any button bars, drop down list selectors, combo box selectors,
        data entry fields)
    </sub_section>

<content>
        (This section describes any user interface components required for the content portion of
        the page. This can include all of the user interface elements described previously, plus
        any applets, flash movies or other multimedia elements as required.)
    </content>

<toolbar>
        (This section describes any selectors, checkboxes, button bars, drop down list selectors,
        combo box selectors, or data entry fields required.)
    </toolbar>

</module>
```

Where possible, we have tried to use pre-existing standards for interface definition, rather than making up our own. Consequently, please refer to the following two documents located at the following URLs to get a flavor of the philosophy behind this structure:

*XUL Tutorial*              http://www.xulplanet.com/tutorials/xultu/

*XUL Programmer's Reference Manual*    http://www.mozilla.org/xpfe/xulref/

An example of this XML file structure, describing the NetCensus General Traffic Statistics page shown on page one of this specification is included on the next page. Although this description only describes the module, section, sub-section, and toolbar portions of the page, it should be enough to provide a flavor of how to define a page for use in the Marketing Framework. This file would be generated by an XSP script running in response to a user requesting a specific URI from a Cocoon server.

XML Specification for Defining Marketing Framework Components
*April 11, 2001 — Draft, v0.5*

```xml
<?xml version="1.0" encoding="UTF-8"?>
<!-- edited with XML Spy v3.5 NT (http://www.xmlspy.com) by H. M. Kaufman (Centerville Technologies/Engineering) -->
<module name="NetCensus" sonified="yes">
    <section>
        <menu name="main" prompt="SELECT A SECTION ">
            <menuitem name="General Site Traffic" value="http://think.with-us.com/nc/traffic"/>
            <menuitem name="Database Statistics" value="http://think.with-us.com/nc/statistics"/>
            <menuitem name="Marketing Performance" value="http://think.with-us.com/nc/performance"/>
            <menuitem name="Commercial Investment" value="http://think.with-us.com/nc/investment"/>
            <menuitem name="Purchase Pathway" value="http://think.with-us.com/nc/pathway"/>
        </menu>
    </section>
    <sub_section name="General Site Traffic">
        <selector name="site_name" method="post" action="">
            <list name="SITES" prompt="SELECT A SITE">
                <listitem name="SALES SITES" value="10"/>
                <listitem name="- Main Portal" value="11"/>
                <listitem name="- Portal US" value="12"/>
                <listitem name="- Portal Europe" value="13"/>
                <listitem name="- Portal Asia" value="14"/>
                <listitem name="- Business" value="15"/>
                <listitem name="- Leisure" value="16"/>
                <listitem name="- MCC" value="17"/>
                <listitem name="- Cafe Express" value="18"/>
                <listitem name="HOTEL SITES" value="20"/>
                <listitem name="- Aberdeen" value="21"/>
                <listitem name="- Birmingham" value="22"/>
                <listitem name="- Kent" value="23"/>
                <listitem name="- London" value="24"/>
            </list>
            <date_picker name="FROM" class="date" action="select"/>
            <date_picker name="UNTIL" class="date" action="select"/>
            <button name="go" prompt="go" action="submit"/>
        </selector>
    </sub_section>
    <content>
        <panel width="64%">
            <line>
                <checkbox label="Page Views :" value="1843"/>
                <checkbox label="Home Page views :" value="1843"/>
            </line>
            <line>
                <checkbox label="Number of Visitors :" value="1843"/>
                <checkbox label="No. of Visitors per day :" value="1843"/>
            </line>
            <line>
                <checkbox label="New Visitors :" value="1843"/>
                <checkbox label="Length of Time on site :" value="1843"/>
            </line>
            <line>
                <checkbox label="Repeat Visitors :" value="1843"/>
                <checkbox label="Average no. of pages visited :" value="1843"/>
            </line>
            <table title="Most Popular Pages" type="numbered">
                <checkbox label="Millennium Deals" value="1843"/>
                <checkbox label="Stay.with-us - Hotel View" value="1843"/>
                <checkbox label="Make a Booking" value="1843"/>
                <checkbox label="Picture Gallery" value="1843"/>
            </table>
            <table title="Top Referring Sites" type="numbered">
                <checkbox label="LondonTown.com" value="1843"/>
                <checkbox label="Thomas Cook" value="1843"/>
                <checkbox label="Sony.com" value="1843"/>
            </table>
        </panel>
        <panel width="36%">This is panel two (graph goes here)</panel>
    </content>
```

Company Confidential — *Centerville Technologies, Inc.*

XML Specification for Defining Marketing Framework Components
April 11, 2001 — Draft, v0.5

```
<toolbar name="exportBar" prompt="export to >>">
    <tool name="excelExport" label="EXCEL" action="doExcelExport" tip="Export this data to an MS Excel file"/>
    <tool name="pPointExport" label="POWERPOINT" action="doPPointExport" tip="Export this data as a PowerPoint
                                                                                                    presentation"/>
    <tool name="wordExport" label="WORD" action="doWordExport" tip="Export this data to an MS Word file"/>
    <tool name="jpegExport" label="JPEG" action="doJPegExport" tip="Export this data as a JPEG image"/>
    <button name="printGraph" label="PRINT" action="doPrintGraph" tip="Print a copy of the graph"/>
</toolbar>
</module>
```

Section & Tag Descriptions

**<module name=" *text.display* " sonified=" *yes.or.no* ">**

The <module> section of the file is used to hold any information about the pipeline that may be required throughout the life of the document as it moves through the pipeline. This tag takes a single attribute, which is the name of the module to display. The sonification attribute is used to invoke the built-in Beatnik sounds for buttons, checkboxes, and tool bars. To date, we have defined the following tags:

<organization>

Specifies the name of this company (and it's associated stylesheet).

**<logo location=" *text.uri or file name* "/>**

Specifies where the company's logo can be found, in either gif, jpeg, or png format.

<section>

The <section> portion of the file is used to hold any information about the content that needs to appear at the immediate top of the page. Typically, this will include one or more menus or button bars, from which the user will make a section that will cause other portions of the page to load. To date, we have defined the following tags:

**<menu name=" *text* " prompt=" *text.display* ">**

Indicates that a menu should appear in the first available position in the section. This tag and its associated sub-tags describe the format of the menu to be displayed. (Typically these will appear as DHTML drop-down menus.) The structure of this tag is loosely based on the XUL standard for describing menu objects, although it is a subset of the specification, since many of the attributes do not make sense in the context of our application.

| | |
|---|---|
| name | Name of menu object (for use with DHTML) |

Company Confidential — *Centerville Technologies, Inc.*

XML Specification for Defining Marketing Framework Components
April 11, 2001 - Draft, v0.5 prompt    Prompt text that appears in the user interface followed by a down arrow indicating where the user should click.

<menuitem name=" *text.display* " value=" *uri.destination* ">

Indicates that an item should appear in the parent menu. This tag and its associated properties describe the format of the item to be displayed in the menu.

| | |
|---|---|
| name | Contains text to be displayed for this Item in the drop down menu. |
| value | URI of the web page to display if the user selects this menu item. |

<sub_section name=" *text.display* ">

The <sub_section> portion of the file is used to hold any information about the content that needs to appear in the zone at the lower part of the top of the page. Typically, this will include one or more menus or button bars, or various "selector" interface widgets to allow the user to be able to search a database or otherwise modify what is displayed in the content section of the page. This tag takes a single property, the name of the sub-section, which is formatted and displayed as a title in the sub-section area of the page. To date, we have defined the following tags:

<selector name=" *text* " method=" *text.method* " action=" *javaScript.function* ">

Indicates that a form is to be inserted here to allow a user to make choices that will adjust the contents of another section of the application. The selector tag marks the demarcation points for the form, and any widgets that will have their values submitted to the server when the user clicks on the submit button.

| | |
|---|---|
| name | Name of the form object, which is required in order to manipulate the form via JavaScript / DHTML |
| method | Text that indicates the method for handling the HTML form data. |
| action | Can be used to invoke a JavaScript / DHTML routine when the user submits this form. |

<button name=" *text* " prompt=" *text.display* " action=" *text* ">

Indicates that a button widget with a text label should be displayed in the first available position with in the selector to allow a user to perform some action to the selector.

XML Specification for Defining Marketing Framework Components
April 11, 2001 – Draft, v0.5

| | |
|---|---|
| name | Name of button object (*required so list box contents can be accessed via JavaScript / DHTML*). |
| prompt | Text that displays as a prompt on the face of the button. |
| action | Text that is filled in as the HTML button type. |

<date_picker name=" *text* " prompt=" *text.display* ">

Indicates that a single date widget should be displayed in the first available position with in the selector. A date widget allows the user to be able to specify a date in the form of MM/DD/YYYY, where "MM" is equal to the two digit value for the month of the year, while "DD" is equal to the two digit value for the day of the month, while "YYYY" is equal to the four digit value for the century.

| | |
|---|---|
| name | Name of date_picker object (*required so list box contents can be accessed via JavaScript / DHTML*). The individual fields in the widget will be accessible as name.mm for the month name.dd for the day, and name.yyyy for the year. |
| prompt | Text that displays as a prompt directly to the left of the list box widget. |

<list name=" *text* " prompt=" *text.display* ">

Indicates that either a single list box widget should be displayed in the first available position with in the sub-section to allow a user to put together a query to modify the specific contents of the content section of the page.

| | |
|---|---|
| name | Name of list object (*required so list box contents can be accessed via JavaScript / DHTML*). |
| prompt | Text that displays as a prompt directly to the left of the list box widget. |

<listitem name=" *text.display* " value=" *text.value* ">

Indicates that an item should appear in the list box widget. This tag and its associated properties describe the format of the item to be displayed in the menu.

| | |
|---|---|
| name | *Contains text to be displayed for this item in the list box widget.* |
| value | *Text with value information (either alpha or numeric) that will be passed via a form submit.* |

Company Confidential – *Centerville Technologies, Inc.*

XML Specification for Defining Marketing Framework Components
April 11, 2001 – Draft, v0.5

<content>

The <content> portion of the file is used to hold any information about the content that needs to appear in the zone directly in the middle of the page. This can be defined in a variety of ways to reflect a number of different display formats. This section can either be rendered as a single entity, or broken down into a series of vertical "panels. Within a panel, additional content can be specified using either <line> or <table> tags *(more information on this is available on the following pages)*. A good way to think about this structure is to consider it as being very similar to HTML tables where panels are equivalent to columns, and windows are equivalent to rows. However, this metaphor is not completely accurate, as we encapsulate the row data within a column, where in an HTML table the column data is encapsulated within the row data. This was changed for two reasons: the first was for easier processing within the XSLT engine; while the second had to do with how we were expecting data to be handled within the system.

<graph>

Indicates that the content contained within this tag should be rendered as a graph using the XSLT SVG graphing stylesheet.

<panel width=" *number.percentage* " >

Indicates that a vertical panel should be created in the content section of the page. Panels act as a way to organize content that should be located together on the page.

| | |
|---|---|
| width | Number used as a percentage of the width of the browser window. Using a percentage allows us to rescale the relationship between individual objects within the page. Please note that the total width of all panels must not exceed 100%, as there is no error checking within the XSLT style sheet.. |

<line>

Indicates that the content contained within this tag should be rendered as being on a single line, either inside of a panel, or simply within the entire content section of the page. Small lines of text, and selectors can be specified inside of <line> tags, and these will be rendered as a single line of content – similar in function and look and feel to a toolbar. Within a set of <line> tags, it is possible to specify the following tags:

<chart_picker name=" *text* " prompt=" *text.display* " target= "*chart.name*">

Indicates that a single chart type selection widget should be displayed in the first available position with in the line. A chart type selection widget allows the user to be able to specify the plot format of the chart named in the target property for the tag.

| | |
|---|---|
| name | Name of chart_picker object. |

Company Confidential – *Centerville Technologies, Inc.*

XML Specification for Defining Marketing Framework Components
*April 11, 2001 – Draft, v0.5*

| | |
|---|---|
| prompt | Text that displays as a prompt directly to the left of the chart picker selection widget. |
| target | Name of the chart that this picker is associated with. |

**<data prompt=" *text.display* " type=" *data.type* " class=" *class.type* ">**

Indicates that a single piece of data should be displayed in the first available position with in the line. The format of the data is specified using both the type and class attributes as described below:

| | |
|---|---|
| prompt | Text to display to the left of the data as an explanatory label. |
| type | Can be one of three values: NUMBER, TEXT, or PERCENT. Specifying TEXT forces the prompt and the data to have the same amount of display space. Specifying either NUMBER or PERCENT causes the data to be displayed with the prompt taking up about 80% of the space, and the DATA taking up about 20% of the display space. |
| class | Can be specified as either MAJOR or MINOR. MAJOR data is rendered in bold and in a slightly larger type than MINOR data elements. |

<text>

Used to render small amounts of text within the context of a set of <line> tags, or can be used by itself to render text either in a <panel> or simply stand-alone in the content section.

**<table title=" *text.display* " type=" *type.table* ">**

Indicates that the content contained within this tag should be rendered in the form of a table, either inside of a panel, or simply within the entire content section of the page. Tables currently come in only two types – numbered and unnumbered. A numbered table generates a list of entries with a number in front of each one, while an unnumbered table generates them as a bulleted list.

| | |
|---|---|
| title | Text to display as the title of the table. This text is handled differently depending on the XSLT and CSS style sheets used to create the final HTML document. |
| type | Determines how content is formatted within the table. Currently this attribute only supports two values: numbered, which creates a numbered list of items; and unnumbered which creates a bulleted list. |

Company Confidential – *Centerville Technologies, Inc.*

XML Specification for Defining Marketing Framework Components
April 11, 2001 – Draft, v0.5

<toolbar name=" *text* " prompt=" *text.prompt* ">

The <toolbar> portion of the file is used to hold any information about the toolbar that runs along the bottom of the page. This can be defined in two ways – there are a series of selections (a.k.a. *"tools"*) that can be made from the solid colored section in the middle of the bar, and typically these selections will all be related to each other and would directly affect the content in the content pane. Because of this, typically the targets of the individual toolbar elements will probably be references to JavaScript / DHTML routines embedded in the page. On the right section of the toolbar are a series of buttons that can be used to start external events, such as sending a copy of the web page to a printer.

The components in the toolbar are always rendered as text links without decoration that can be clicked on to initiate an action.

| | |
|---|---|
| name | Name of toolbar object (for use with DHTML) |
| prompt | Prompt text that appears in the toolbar to the left of the selections. |

<button name=" *text* " label=" *text.display* " action=" *text* " tip=" *text* ">

Indicates that a link with a text label should be displayed in the first available position on the right side of the toolbar to allow a user to perform some action that affects the page as a whole.

| | |
|---|---|
| name | Name of button object (*required so list box contents can be accessed via JavaScript / DHTML*). |
| label | Text that displays as a prompt on the face of the toolbar. |
| action | Text that is used as the destination for an associated HREF tag. |
| tip | Text that appears as a "tool tip" when the user leaves the cursor over the link for more than a couple of seconds. |

<tool name=" *text* " label=" *text.display* " action=" *text* " tip=" *text* ">

Indicates that a link with a text label should be displayed in the first available position with in the middle of the toolbar to allow a user to perform some action related to the content in the content section.

| | |
|---|---|
| name | Name of button object (*required so list box contents can be accessed via JavaScript / DHTML*). |
| label | Text that displays as a prompt on the face of the toolbar. |
| action | Text that is used as the destination for an associated HREF tag. |

Company Confidential – *Centerville Technologies, Inc.*

XML Specification for Defining Marketing Framework Components
April 11, 2001 – Draft, v0.5 tip      Text that appears as a "tool tip" when the user leaves the cursor over the link for more than a couple of seconds.

< T.B.D. >

Company Confidential – *Centerville Technologies, Inc.*

What we claim is:

1. A digital data processing method for enterprise application integration, comprising:
   A. with a data store, applying the first query to a plurality of data sources using connector logic associated with each of the plurality of data sources,
   B. receiving with the data store, in the form of resource definition framework ("RDF") triplets, information from the plurality of data sources in response to the first query,
   C. with the data store, applying a second query to one or more of the plurality of data sources using connector logic associated with each of the plurality of data sources,
   D. with the data store, receiving in the form of RDF triplets information from the plurality of data sources in response to the second query,
   E. periodically reducing redundancies in the RDF triplets received by the data store in response to the first query and the second query, wherein the step of reducing redundancies includes combining related triplets into bags and merging triplets and bags of similar objects.

2. The method according to claim 1, wherein the step of reducing redundancies includes determining a confidence level that two or more RDF triplets represent redundant information.

3. The method according to claim 1, comprising generating the first query based on user input and applying the first query to the data store.

4. The method according to claim 3, comprising generating the first query based on user input in a web browser.

5. The method according to claim 1, comprising storing, in the connector logic, the first query for subsequent application to the plurality of data sources.

6. The method according to claim 5, comprising applying the stored query to the plurality of data sources at predetermined intervals.

7. The method according to claim 6, comprising caching information received from the plurality of data sources in the connector logic for subsequent transmittal to the data store.

8. A digital data processing method for enterprise application integration, comprising:
   A. with a data store, applying the first query to a plurality of data sources using connector logic associated with each of the plurality of data sources,
   B. with the data store, receiving in the form of resource definition framework ("RDF") triplets information from the plurality of data sources in response to the first query,
   C. with the data store, generating and applying a second query to one or more of the plurality of data sources in order to update the data store,
   D. applying a third query to the data store,
   E. with the data store, generating and applying a fourth query to one or more of the plurality of data sources in order to obtain information necessary to respond to the third query, based at least in part on the data store's determination that it does not include sufficient information to respond to the third query; and
   F. reducing redundancies in the RDF triplets received by the data store in response to the first query and the second query, wherein the step of reducing redundancies includes combining related triplets into bags and merging triplets and bags of similar objects.

9. The method of claim 8, wherein generating and applying a fourth query to one or more of the plurality of data sources comprises generating the fourth query based at least in part on the RDF triplets information received in response to the first query.

10. The method of claim 8, wherein the data store generates the fourth query by passing the third query to connector logic for application to the plurality of data sources.

11. The method of claim 8, wherein the data store generates the fourth query by constructing that query.

12. A digital data processing method for enterprise application integration comprising:
   applying a first query to a data store,
   with the data store, generating and applying a second query to one or more of a plurality of data sources in order to obtain information necessary to respond to the first query, based at least in part on the data store's determination that it does not include sufficient information to respond to the first query;
   wherein the data store applies the second query to the plurality of data sources using connector logic associated with each of the plurality of data sources and receives, in the form of resource definition framework ("RDF") triplets, information from the plurality of data sources in response, the method further comprising:
   reducing redundancies in the RDF triplets received by the data store in response to the first query and the second query, wherein the step of reducing redundancies includes combining related triplets into bags and merging triplets and bags of similar objects.

13. The method of claim 12, wherein the data store generates the second query by passing the first query to connector logic for application to the plurality of data sources.

14. The method of claim 12, wherein the data store generates the second query by constructing that query.

15. A digital data processing method for enterprise application integration comprising:
   A. with a data store, applying a first query to a plurality of data sources using connector logic associated with each of the plurality of data sources,
   B. with the data store, receiving in the form of resource definition framework ("RDF") triplets information from the plurality of data sources in response to the first query,
   C. applying a second query to the data store,
   D. with the data store, generating and applying a third query to one or more of the plurality of data sources using the connector logic in order to obtain information necessary to respond to the second query, based at least in part on the data store's determination that it does not include sufficient information to respond to the second query; and
   E. reducing redundancies in the RDF triplets received by the data store in response to the first query and the second query, wherein the step of reducing redundancies includes combining related triplets into bags and merging triplets and bags of similar objects.

16. The method according to claim 15, comprising generating the first query based on user input and applying the first query to the data store.

17. The method according to claim 16, comprising generating the first query based on user input in a web browser.

18. The method according to claim 15, comprising storing, in the connector logic, the first query for subsequent application to the plurality of data sources.

19. The method according to claim 18, comprising applying the stored query to the plurality of data sources at predetermined intervals.

20. The method according to claim 19, comprising caching information received from the plurality of data sources in the connector logic for subsequent transmittal to the data store.

21. The method of claim 15, wherein the data store generates the third query by passing the second query to connector logic for application to the plurality of data sources.

22. The method of claim 15, wherein the data store generates the third query by constructing that query.

* * * * *